Patented Feb. 16, 1932

1,845,000

UNITED STATES PATENT OFFICE

KARL WOLLIN, OF BERLIN-CHARLOTTENBURG, EDUARD SMOLCZYK, OF ORANIENBURG, NEAR BERLIN, AND HERMANN ENGELHARD, OF BERLIN, GERMANY, ASSIGNORS TO DEUTSCHE GASGLUHLICHT-AUER-GESELLSCHAFT MIT BESCHRANKTER HAFTUNG, OF BERLIN, GERMANY, A CORPORATION OF GERMANY

METHOD FOR INDICATING THE EXHAUSTION OF SUBSTANCES USED FOR CLEANING GASES

No Drawing. Application filed February 12, 1927, Serial No. 167,863, and in Germany June 17, 1926.

Undesired admixtures can be removed from gases by causing these gases to pass through suitable filters, which latter will either absorb the impurities or convert them into less harmful substances. This end can be attained in various ways.

These filtering masses may either react chemically with said impurities in a suitable manner or they may retain them through absorption, or they may finally cause catalytically a suitable reaction, which will render such impurities neutral or inert.

Filtering substances all become exhausted after a certain time, either through gradual consumption of the chemical substances contained therein, or the absorbing masses possess only a certain capability of absorbing said impurities, or finally the catalysts may become poisoned by the substances whose removal from the gases is desired, or they are gradually rendered inactive by other substances contained in the gas.

In many instances it is of the greatest importance to have a signal or warning of the exhaustion of the filtering masses, and frequently the possibility of using such filters depends on the presence of such suitable indicator.

According to the present method this effect is obtained by adding to the current of gas to be cleaned, at a suitable place, indicating substances whose presence is easily discernible, or which can easily be rendered discernible. Such substances must possess the property of behaving in presence of the substances producing the filtering effect, in a similar manner to the impurities in question, that is to say they must also be retained by the filter and penetrate through the filtering masses approaching their state of exhaustion, at or slightly before the breakdown of the filtering masses with respect to their action on such impurities.

It is well known to add to noxious gases easily discernible substances, for instance so-called warning substances. Thus, work with hydrocyanic acid may be rendered comparatively safe by adding an easily discernible irritating substance to it. Furthermore it is well known that certain substances of strong smell are purposely not removed during the purification of coal-gas, in order to render the latter easily discernible. Finally camphor or the like is added as a warning substance to gases containing carbon-monoxide.

But novelty exists in the application of such warning substances in devices serving for the purification of gases from impurities and the employment of such warning substances which, as described above, will penetrate through the filter and act as a signal or warner, only when the action of the filter commences to weaken and in consequence there is danger of those impurities passing through the filter which are intended to be retained thereby.

The method here described is of particular importance in connection with open filtering devices, when they are to be used as a protection against poisonous substances which are discernible only with difficulty or not at all, as for instance carbon monoxide, hydrocyanic acid, quicksilver or the like. In this instance without a device of the kind described above, the danger would arise for the bearer of the device, that he is relying upon the safety and protection afforded to him by the filtering device, while in fact the filter is already exhausted. Through the addition of a smelling or irritating substance as mentioned above, which will pass through the filter as soon as the latter approaches exhaustion, a corresponding warning signal is given. The warning substance may be admixed either constantly to the gases to be purified, or after definite periods or if desired only, when it is desired to examine the efficacy of the filter. For instance in the case of filtering substances acting by absorption, like active carbon, which is used for retaining substances discernible with difficulty or not at all, as for instance organic vapors, say, benzol vapors, are mixed with the air from time to time in a suitable manner. As long as this benzol vapor is entirely retained by the filter, this will afford a guaranty, that the non-discernible vapors referred to will not penetrate through the filter. As another example, we may refer to the use of alkaline substances, in order to free the air from nitrous gases, which cannot easily be detected, but which are very injurious to health. In this instance, for example, some acetic acid is added to the air from time to time, whose penetration through the filter will indicate the exhaustion of the alkaline mass. As a third example we may mention filtering substances, which serve for freeing the air from carbon-monoxide. These are substances, which for instance will convert carbon monoxide into carbon dioxide. In this case there is added to the breathing-air continuously or from time to time a substance, possessing a characteristic smell, such substance being likewise consumed or burned by the catalyst and in consequence removed by it, (for instance ammonia gas). If the catalyzer substance becomes inactive, the smelling substance will penetrate unburnt and will warn the bearer of the apparatus.

The same method in principle, as described here more particularly in respect of breathing filter devices, can of course also be used in order to give warning of the exhaustion of gas purifying masses in industrial plants.

For both purposes of application we may add to the gas to be purified such substance for indicating the exhaustion of the gas purifiers, as will penetrate through the latter and will easily be detected on their exhaustion.

According to the present invention it was found, that in many instances it is easier and more suitable to detect the approaching exhaustion of the gas purifying masses, by introducing into or behind the gas purifying masses at a suitable place, such substances as will react with the first portion of the penetrating impurities contained in the gas and desired to be removed therefrom, forming easily discernible substances. For instance, the penetration of the first traces of hydrocyanic acid can be shown by causing the hydrocyanic acid to act on nicotine, producing a characteristic odour. In lieu of the substance mentioned a mixture of substances can be arranged in or behind the filter, which will react on one another at the penetration of the impurities to be retained, forming a warning substance. In those instances, in which the gradual exhaustion of the filter is not caused by the substances to be removed, but by other admixtures contained in the current of gas, the latter may be used for the production of the signaling or warning substance instead of the impurities proper to be removed. There is for instance, a series of filtering substances, in particular catalytically acting filtering masses, which will be rendered gradually inactive by the effect of moisture. As the filter becomes inactive, the moisture, which until then was retained by the filter, will escape with the gases at the filter outlet, as a harmless admixture to such gases, and this moisture can be utilized to indicate the exhaustion of the filter, for instance through the action of the moisture on carbide and the generation of the easily discernible acetylene or through the action of such moisture on a mixture of phosphorus pentoxide and for instance a hypochlorite and the generation of easily discernible vapors of chlorine. Finally another admixture contained in the current of gas can be used for action on the indicating substance, if said admixture passes through the filter only, when its exhaustion commences. If a suitable admixture is not present in the current of gas, it may be added in a manner similar to that described in the first part of this specification.

We claim:

1. The method of indicating the exhaustion of gas purifying filters, which consists in causing, upon the exhaustion of the filter, the moisture contained in the gas to react with a substance which by such reaction produces a warning agent.

2. The method of indicating the exhaustion of gas purifying filters, which consists in adding to the gas containing impurities to be removed, a substance which by reaction with such impurities will warn of the presence of said impurities, said substance being of such character that the filter will have relatively thereto substantially the same efficiency that it has relatively to said impurities, so that the filter will become exhausted at substantially the same time with respect to said substance and to the said impurities.

In testimony whereof we affix our signatures.

KARL WOLLIN.
EDUARD SMOLCZYK.
HERMANN ENGELHARD.